J. MARETTE.
FRICTION DRIVE MECHANISM.
APPLICATION FILED MAR. 17, 1920.

1,363,338.

Patented Dec. 28, 1920.
2 SHEETS—SHEET 1.

INVENTOR
JACQUES MARETTE
By *[signature]*
HIS ATTORNEY

J. MARETTE.
FRICTION DRIVE MECHANISM.
APPLICATION FILED MAR. 17, 1920.

1,363,338.

Patented Dec. 28, 1920.
2 SHEETS—SHEET 2.

INVENTOR
JACQUES MARETTE
By
HIS ATTORNEY

UNITED STATES PATENT OFFICE.

JACQUES MARETTE, OF VINCENNES, FRANCE, ASSIGNOR TO PATHE CINEMA, ANCIENS ETABLISSEMENTS PATHE FRERES, OF VINCENNES, SEINE, FRANCE, AND T. ROBATEL, J. BUFFAUD & CIE., OF LYON, RHONE, FRANCE.

FRICTION-DRIVE MECHANISM.

1,363,338.   Specification of Letters Patent.   Patented Dec. 28, 1920.

Application filed March 17, 1920. Serial No. 366,597.

*To all whom it may concern:*

Be it known that I, JACQUES MARETTE, citizen of the Republic of France, residing at 30 Rue des Vignerons, Vincennes, Seine, in the Republic of France, have invented new and useful Improvements in Friction-Drive Mechanisms, of which the following is a specification.

The present invention relates to friction drive mechanism for wheels or fly-wheels of large size which are to rotate around their axes with an absolutely uniform slow movement inside a tight casing.

The object of the present invention is to provide mechanism which allows of transmitting without shocks a uniform movement of rotation to large fly-wheels which have to rotate very slowly for instance two rotations in an hour.

It has been found unsatisfactory to drive the shaft of the fly-wheel by means of wheels with helicoidal teeth and driven by a worm the movement being transmitted in this case from the toothing of the wheel to the shaft then to the fly-wheel, since the vibrations of the worm are amplified by the elasticity of the metal, particularly if the period of vibration of the whole is near or is a multiple of the number of rotations of one of the driving members.

It has also been proposed to directly act on the wheel as near as possible to its rim for example by helicoidal teeth formed on the rim of the wheel and actuated by a worm or endless screw. This arrangement is satisfactory in certain cases but in the application intended by the present invention this is defective as the mechanism (teeth and endless screw) is inside the tight casing and is liable to inconvenience in the applications of the machine.

Driving by means of a pinion and straight teeth or chevron teeth is not satisfactory for the same reasons.

The mechanism of the present device consists of two or more rollers, arranged so as to press between them, in pairs, an iron crown fixed on the rim of the wheel, suitably arranged counterweights being provided to regulate this pressure.

The rollers receive partly or entirely a uniform movement of rotation around their axes and produce by adherence the rotation of the crown and thereby the wheel.

The axles of these rollers are provided and also the axle of the wheel with suitably arranged stuffing boxes to assure tight joints where they pass through the walls of the casing. These axles can be given their movement of rotation for instance by endless screws.

An example of construction of the invention is illustrated in the annexed drawing in which.

Figure 1:
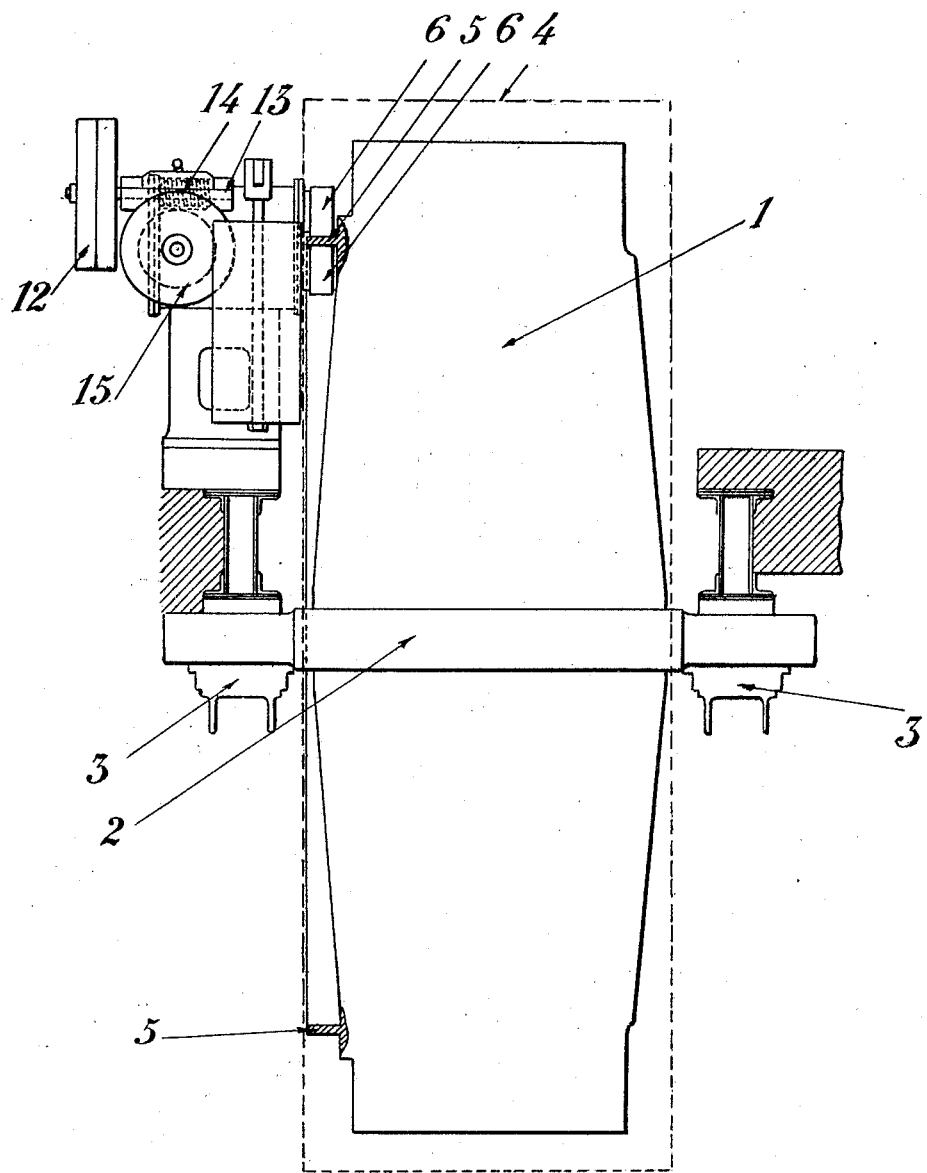
Figure 1 is a side view of the mechanism of the invention.
Figure 2:
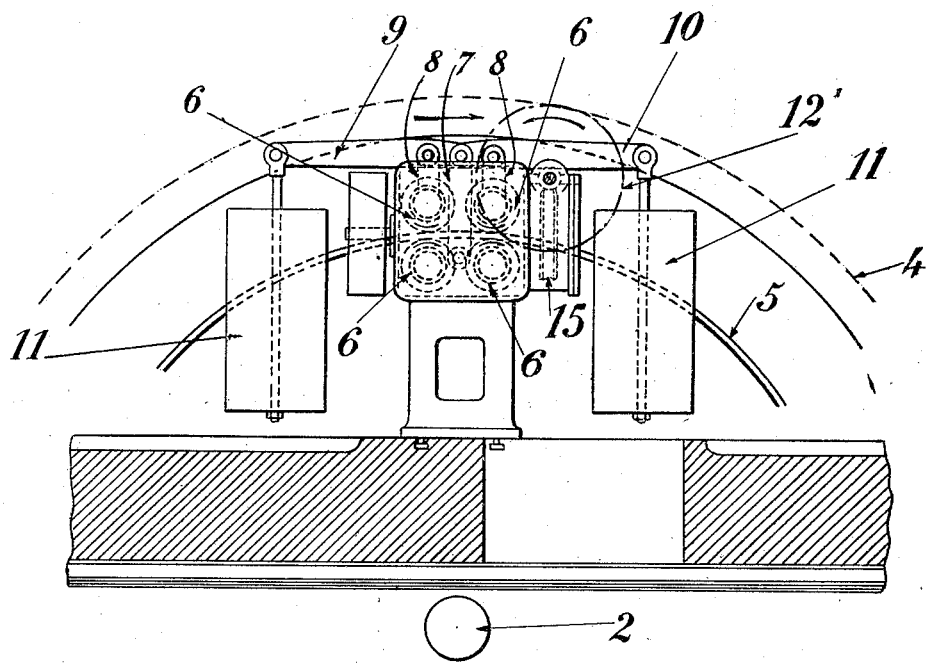
Fig. 2 is a view in elevation.
Figure 3:
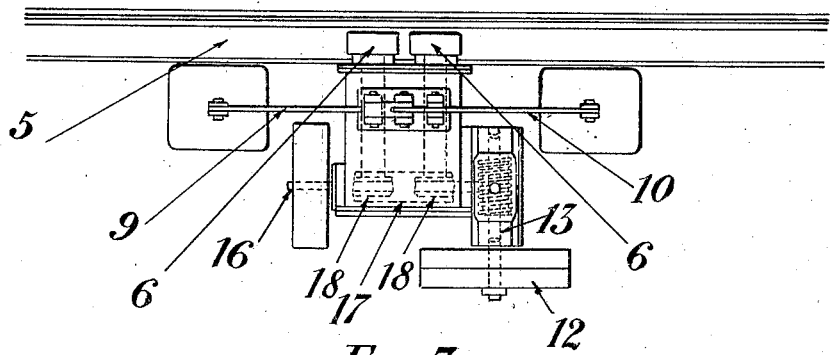
Fig. 3 is a corresponding view in plan.

The wheel 1 is supported by its axle 2 and the bearings 3, it rotates in a tight casing 4. A smooth crown 5 integral with the wheel receives the movement of four rollers 6.

The axle blocks of the rollers 6 are movable in vertical slides so as to allow them a certain amount of play, these bearings are governed by rods 7 and 8 which are connected to the ends of levers 9 and 10 by pivotal joints.

On the ends of the levers 9 and 10 are suspended counterweights 11 in such a way that the two upper rollers 6 tend to be pushed downward while the lower rollers 6 are drawn upward; the whole of the four rollers exactly coincide with the crown 5, the adherence necessary for the drive being regulated by the counterweights.

On the drawing, is shown by way of example driving means comprising a pulley 12 which actuates a shaft 13 on which is keyed an endless screw 14 which drives a helicoidal wheel 15 carried by a shaft 16 with which is keyed the endless screw 17 itself actuating the helicoidal wheels 18. The latter drive the shafts of the upper rollers 6.

Having now described my invention, what I claim as new and desire to secure by Letters Patent is:

1. A friction drive mechanism for a wheel rotating slowly and uniformly inside a tight casing, comprising in combination: a tight casing, a rotatable wheel inside said casing, a crown secured on the wheel, rollers adapted to clamp said crown between themselves, shafts carrying said rollers, stuffing boxes on the tight casing through which said shafts extend, means for rotating said shafts and means for pressing the rollers toward each other, substantially as described and for the purpose set forth.

2. A friction drive mechanism for a wheel rotating slowly and uniformly inside a tight casing, comprising in combination, a tight casing, a rotatable wheel inside said casing, a crown secured to the wheel, rollers adapted to clamp said crown between themselves, shafts carrying said rollers, stuffing boxes on the tight casing, through which said shafts extend, means for rotating said shafts, and counterweights adapted to press the rollers toward each other, substantially as described.

3. A friction drive mechanism for a wheel rotating slowly and uniformly inside a tight casing, comprising in combination, a tight casing, a rotatable wheel inside said casing, a crown secured to the wheel, rollers adapted to clamp said crown between themselves, shafts carrying said rollers, stuffing boxes on the tight casing, through which said shafts extend, a worm drive operatively connected to said shafts and counterweights adapted to press the rollers toward each other, substantially as described.

4. A friction drive mechanism for a wheel rotating slowly and uniformly inside a tight casing, comprising in combination: a tight casing, a rotatable wheel inside said casing, a crown secured to the wheel, two outer rollers in contact with the outer surface of the crown, two inner rollers in contact with the inner periphery of the crown, shafts carrying said rollers, stuffing boxes through which said shafts extend, blocks in which the shafts of the outer rollers are respectively journaled, side links pivoted to said blocks, a block in which the shafts of the inner rollers are journaled, a central link pivoted to said block, levers pivotally connected at one end to the central link and intermediate their ends to one of the side links, respectively, counterweights carried by the free ends of said levers and means for rotating said shafts, substantially as described.

5. A friction drive mechanism for a wheel rotating slowly and uniformly inside a tight casing, comprising in combination: a tight casing, a rotatable wheel inside said casing, a crown secured to the wheel, two outer rollers in contact with the outer surface of the crown, two inner rollers in contact with the inner periphery of the crown, shafts carrying said rollers, stuffing boxes through which said shafts extend, blocks in which the shafts of the outer rollers are respectively journaled, side links pivoted to said blocks, a block in which the shafts of the inner rollers are journaled, a central link pivoted to said block, levers pivotally connected at one end to the central link and intermediate their ends to one of the side links, respectively, counterweights carried by the free ends of said levers, worm wheels on the shafts of the outer rollers, a worm meshing with said worm wheels, and a speed reducing worm drive for actuating said worm, substantially as described.

In testimony whereof I have signed my name to this specification.

JACQUES MARETTE.